United States Patent
Eichen et al.

(10) Patent No.: US 9,088,885 B2
(45) Date of Patent: *Jul. 21, 2015

(54) IMPLICIT REGISTRATION FOR MULTIPLE IDENTITIES

(71) Applicant: Verizon Patent and Licensing Inc., Basking Ridge, NJ (US)

(72) Inventors: Elliot G. Eichen, Arlington, MA (US); Rafael Andres Gaviria Velez, Medford, MA (US); Rezwanul Azim, Arlington, MA (US); Gowtham Javaregowda, Waltham, MA (US); Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/722,478

(22) Filed: Dec. 20, 2012

(65) Prior Publication Data

US 2014/0179309 A1   Jun. 26, 2014

(51) Int. Cl.
*H04M 11/10*  (2006.01)
*H04W 8/26*  (2009.01)
*H04W 8/20*  (2009.01)

(52) U.S. Cl.
CPC .. *H04W 8/26* (2013.01); *H04W 8/20* (2013.01)

(58) Field of Classification Search
USPC .......................................................... 455/433
See application file for complete search history.

(56) References Cited

U.S. PATENT DOCUMENTS

| | | | |
|---|---|---|---|
| 2005/0176421 A1* | 8/2005 | Matenge et al. | 455/426.1 |
| 2006/0293034 A1* | 12/2006 | Armstrong | 455/414.1 |
| 2012/0243471 A1* | 9/2012 | Boulos et al. | 370/328 |

* cited by examiner

*Primary Examiner* — Charles Appiah
*Assistant Examiner* — Randy Peaches

(57) ABSTRACT

A device receives a personal Mobile Directory Number (MDN) associated with an individual subscriber, where the individual subscriber is further associated with one or more subscriber devices. The device receives a corporate MDN assigned to the individual subscriber. The device links the corporate MDN, the personal MDN, and the one or more subscriber devices within an Implicit Registration Set (IRS) at a Home Subscriber Server (HSS) in an Internet Protocol Multimedia Subsystem (IMS) for routing calls to the individual subscriber's corporate MDN or personal MDN at the one or more subscriber devices.

21 Claims, 14 Drawing Sheets

IMPLICIT REGISTRATION FOR MULTIPLE IDENTITIES

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions with one or more participants.

DETAILED DESCRIPTION OF THE PREFERRED EMBODIMENTS

Figure 1A:
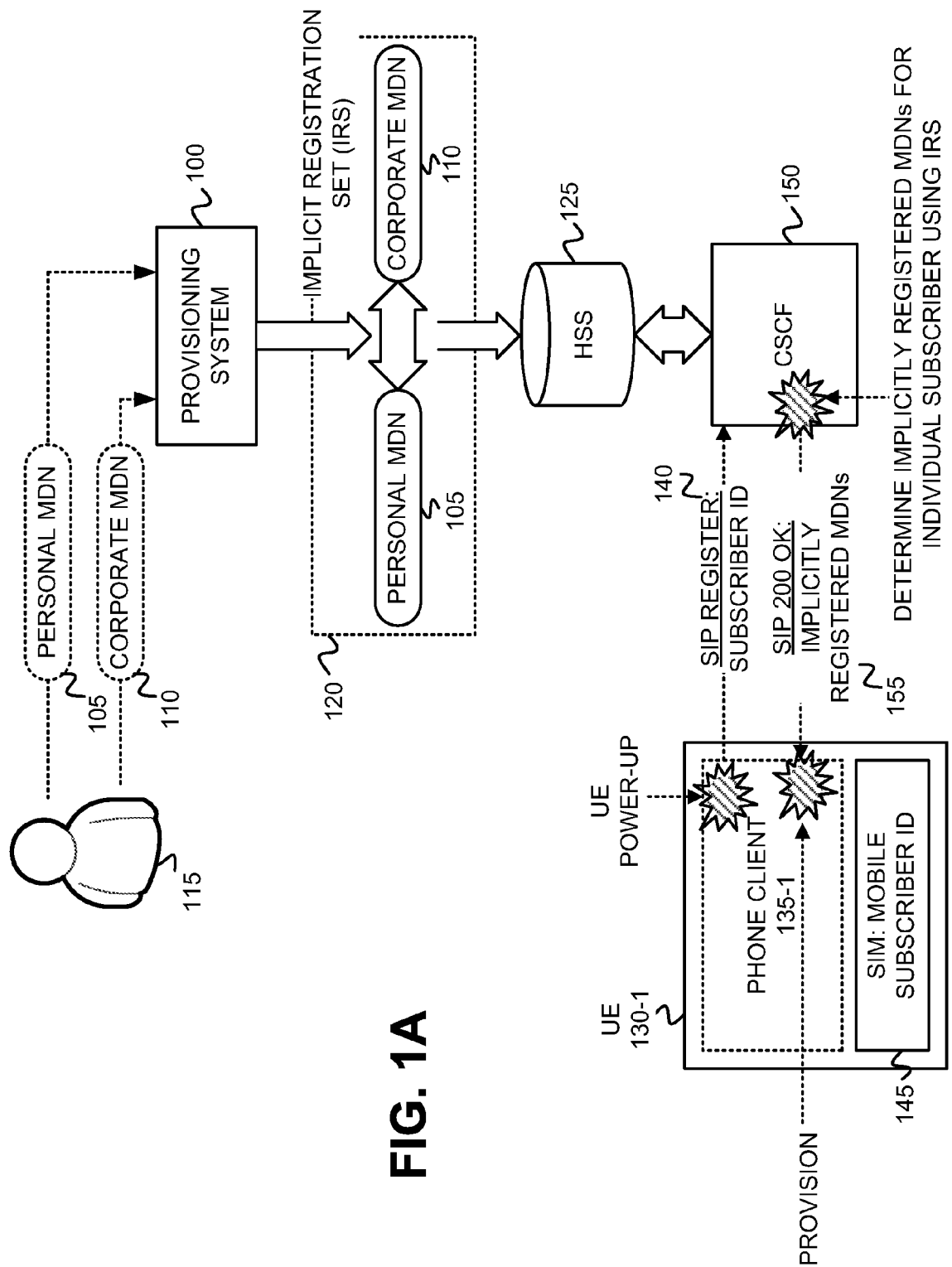
FIGS. 1A and 1B illustrate an overview of the implicit registration of multiple Mobile Directory Numbers associated with a subscriber in an Implicit Registration Set of a Home Subscriber Server in an IMS network.

The following detailed description refers to the accompanying drawings. The same reference numbers in different drawings may identify the same or similar elements. The following detailed description does not limit the invention.

Using multiple calling identities, where a single subscriber is associated with multiple different Mobile Directory Numbers (MDNs), has become common in modern mobile telephony. For example, a single subscriber has a personal phone account with a first MDN, and a work phone account with a second MDN. One existing implementation of dual identities uses two different Subscriber Identity Modules (SIMs) in the subscriber's mobile device, with one SIM storing the personal MDN, and the other SIM storing the work MDN. Another existing implementation of dual identities uses a single SIM that is "burned" with both the personal MDN and the work MDN. These existing techniques for implementing multiple calling identities require the mobile device's one or more SIMs to be "burned" with the multiple different MDNs that are associated with the single subscriber, thus, requiring the SIMs to be switched out, or "re-burned" to add/change calling identities.

Exemplary embodiments described herein use an implicit registration in IMS to link multiple different MDNs for a single subscriber having a single SIM "burned" with a single mobile subscriber identity (IMSI). IMS messaging may be used to link the multiple different MDNs for the single subscriber in an Implicit Registration Set stored in a Home Subscriber Server of the IMS network. Via the linking of the multiple MDNs in the Implicit Registration Set, a call to any one of the linked multiple MDNs can be routed to the mobile device associated with the single subscriber by consulting the Implicit Registration Set. Implicit registration, as described herein, therefore, does not require any alteration of the device's or devices' SIMs. At the subscriber's mobile device, the device auto-provisions a different calling identity, address book, and voicemail box for each of the multiple, implicitly registered MDNs such that the subscriber can conduct calls from the mobile device by selecting any one of the multiple MDNs.

A "personal MDN," as described herein, refers to a MDN assigned to a personal telephone account of an individual subscriber. A personal MDN may include, for example, the individual subscriber's personal telephone phone number. The personal MDN, therefore, is associated with the individual subscriber's personal telephone account that is maintained and paid for by the individual subscriber. A "corporate MDN," as described herein, refers to a MDN assigned to a work or business account of an individual subscriber. A corporate MDN may include, for example, the individual subscriber's work or business telephone number. The corporate MDN, therefore, is associated with the individual subscriber's corporate telephone account that is maintained and paid for by the business that he/she owns or that employs him/her.

Figure 1B:
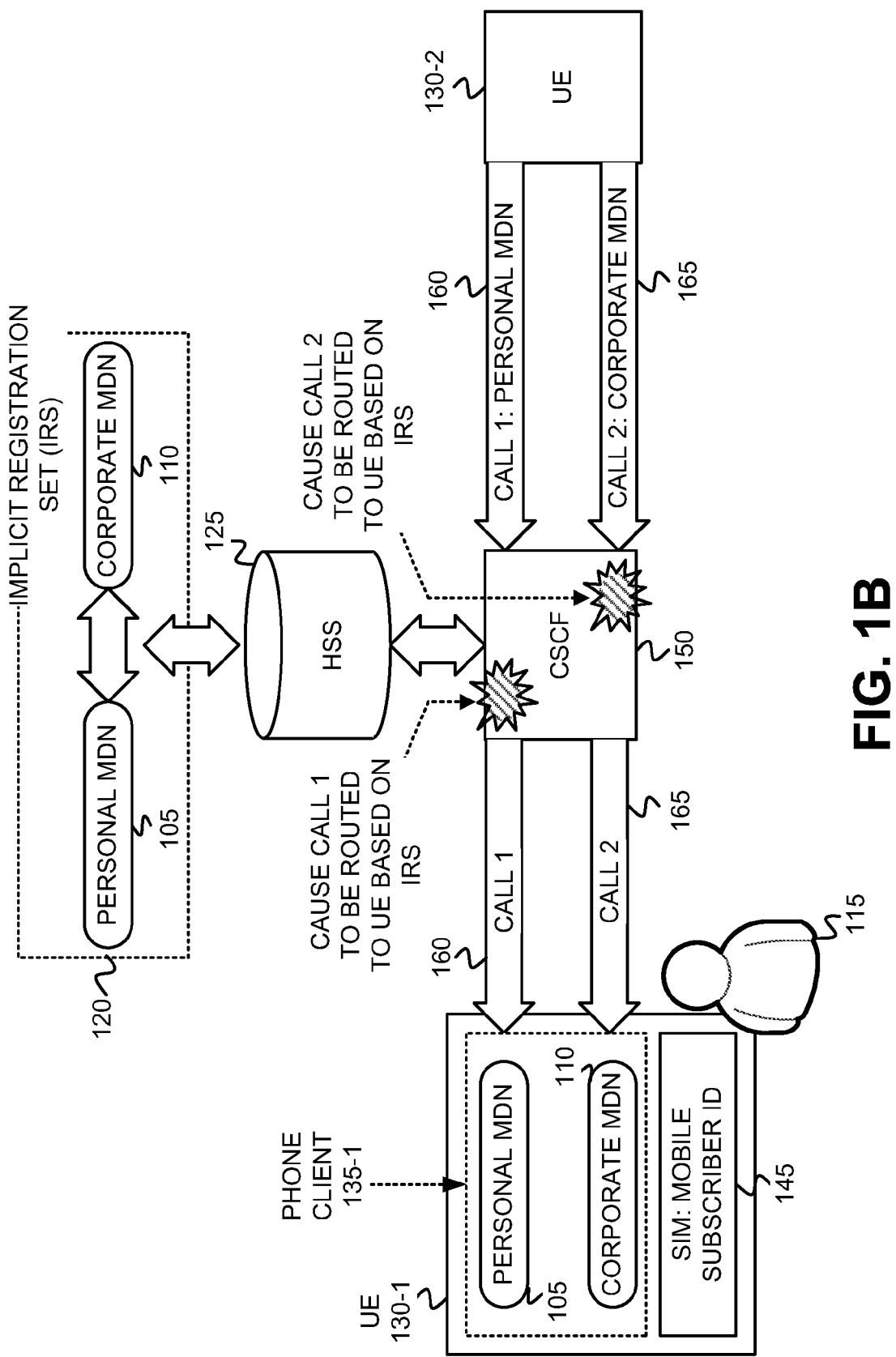

FIGS. 1A and 1B illustrate an overview of the implicit registration of multiple MDNs associated with a subscriber in an Implicit Registration Set (IRS) of a Home Subscriber Server (HSS) in an IMS network. As shown in FIG. 1A, a provisioning system 100 receives a personal Mobile Directory Number (MDN) 105 and a corporate MDN 110 that are both associated with a individual subscriber 115. Personal MDN 105 may include a phone number to a telephone associated with subscriber 115 (e.g., a user equipment). Corporate MDN 110 may include a second phone number associated with subscriber 115. In one embodiment, corporate MDN 110 may include a telephone number assigned to subscriber 115 as subscriber 115's business number (i.e., the number at which subscriber 115 conducts calls for purposes of business). Corporate MDN 110 may include a telephone number assigned to subscriber 115 as an employee work number.

Provisioning system 100 may link, within an Implicit Registration Set (IRS) 120 within a Home Subscriber Server (HSS) 125, personal MDN 105 with corporate MDN 110. The linkage of personal MDN 105 and corporate MDN 110 may further link with one or more User Equipment (UE) devices associated with subscriber 115. Each of the one or more UE devices associated with subscriber 115 may have a subscriber ID (e.g., a mobile subscriber ID) that may, for example, be stored within a Subscriber Identity Module (SIM) contained within each of the one or more UE devices. HSS 125 resides in an IMS network.

Subsequent to linkage of personal MDN 105 and corporate MDN 110 in IRS 120, a UE 130-1 associated with subscriber 115, may power-up. Upon power-up, a phone client 135-1 at UE 130-1 may send an SIP REGISTER message 140, which includes subscriber ID information stored in a SIM 145 at UE 130-1, to a Call Session Control Function (CSCF) 150 in an IMS. CSCF 150 performs a look-up into IRS 120 to determine implicitly registered MDNs for subscriber 115 associated with UE 130-1. The implicitly registered MDNs include personal MDN 105 and corporate MDN 110 linked with one another, and with the subscriber ID stored in SIM 145 of UE 130-1.

CSCF 150 may return a SIP 200 OK message 155 to UE 130-1, where message 155 includes the implicitly registered MDNs (e.g., personal MDN 105 and corporate MDN 110) associated with the subscriber ID stored in SIM 145 of UE 130-1. Upon receipt of SIP 200 OK message 155, phone client 135-1 of UE 130-1 provisions a MDN-specific calling ID, an address book, and a voice mailbox for each of the implicitly registered MDNs included in message 155. UE 130-1 may subsequently send and receive calls from/to each of the implicitly registered MDNs included in message 155.

FIG. 1B depicts an overview of UE 130-1 receiving multiple calls to personal MDN 105 and corporate MDN 110 that may occur subsequent to the implicit registration of multiple MDNs associated with subscriber 115 in IRS 120 of HSS 125, as described with respect to FIG. 1A. As shown in FIG. 1B, another UE 130-2 may send a first call 160 that is destined for personal MDN 105 associated with subscriber 115. Call 1 160 may include an identification of subscriber 115's personal MDN. Upon receipt of signaling associated with call 1 160, CSCF 150 may consult IRS 120 of HSS 125 to determine the subscriber ID and/or UE ID associated with the personal MDN identified in call 1 160. CSCF 150 may cause call 1 160 to be routed to personal MDN 105 at UE 130-1.

As further shown in FIG. 1B, UE 130-2 (or a different UE not shown) may send a second call 165 that is destined for corporate MDN 110 associated with subscriber 115. Call 2 165 may include an identification of subscriber 115's corporate MDN. Upon receipt of signaling associated with call 2 165, CSCF 150 may consult IRS 120 of HSS 125 to determine the subscriber ID and/or UE ID associated with the corporate MDN identified in call 2 165. CSCF 150 may cause call 2 165 to be routed to personal MDN 105 at UE 130-1.

FIGS. 1A and 1B have been described with respect to implicitly registering a personal MDN and a corporate MDN in IRS 120. However, in a similar fashion, more than two MDNs may be implicitly registered within IRS 120 (e.g., a personal MDN and two corporate MDNs, a corporate MDN and two personal MDNs, etc.). Additionally, the multiple MDNs linked in IRS 120 may not just be a personal and a corporate MDN. Two or more personal MDNs, two or more corporate MDNs, or two or more other types of MDNs may be implicitly registered in IRS 120 in other embodiments. Any two or more MDNs may be implicitly registered in IRS 120 using the techniques described herein. FIG. 1A has been described as using SIP messages (e.g., SIP register message 140 and SIP 200 OK message 155) for enabling UE 130-1 to obtain the multiple implicitly registered MDNs from IRS 120 at HSS 125. However, protocols other than SIP may be used in the techniques described herein. Such protocols may employ messaging that is different than SIP register message 140 and SIP 200 OK message 155. IRS 120 may also be stored at other nodes or devices within a network, and not just at HSS 125 in an IMS network.

Figure 2:
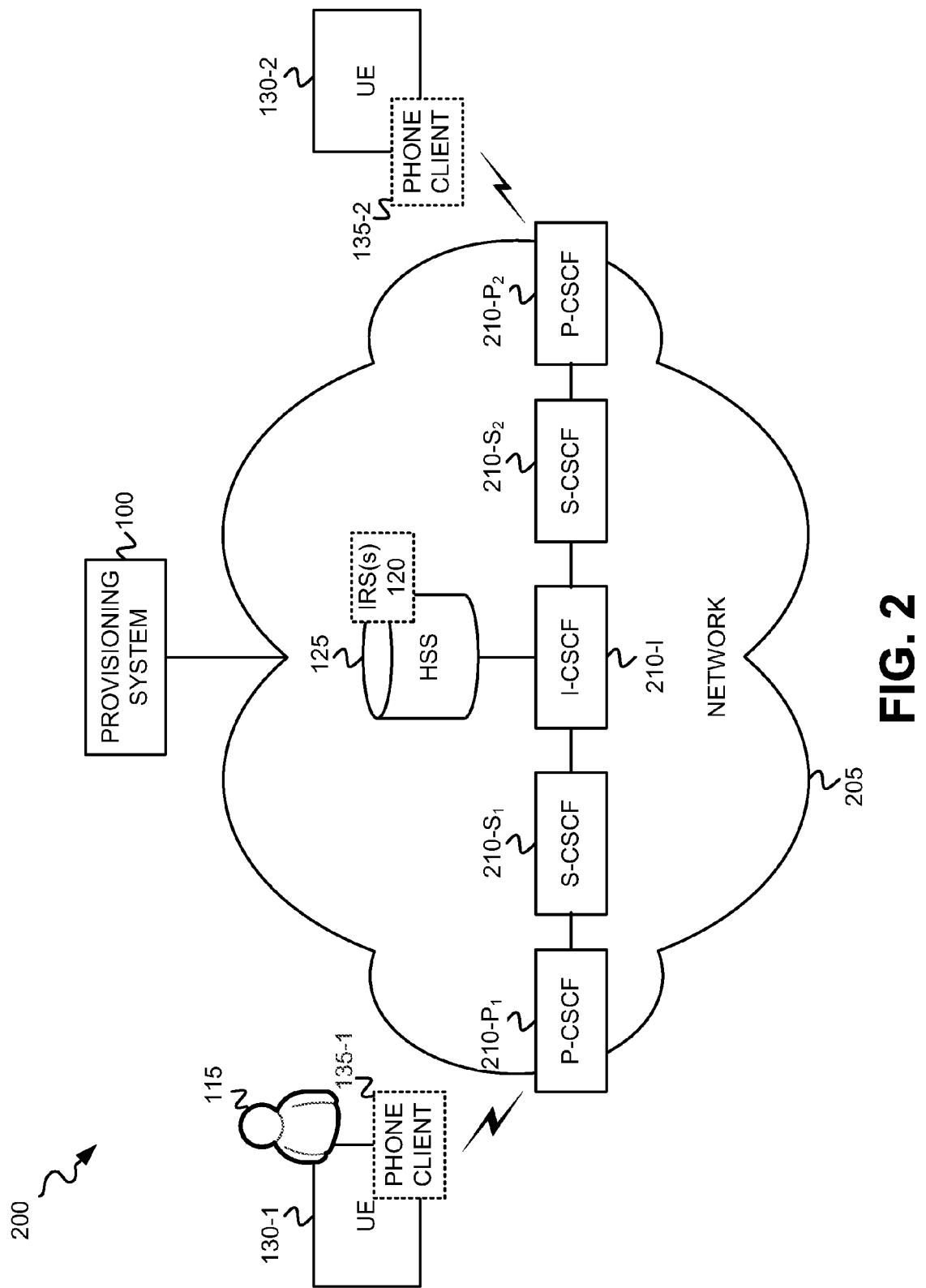
FIG. 2 depicts an exemplary network environment in which multiple Mobile Directory Numbers associated with a subscriber may be implicitly registered in the Implicit Registration Set of the Home Subscriber Network of FIGS. 1A and 1B.

FIG. 2 depicts an exemplary network environment 200 in which multiple MDNs associated with subscriber 115 may be implicitly registered in IRS(s) 120 of HSS 125. As shown, network environment 200 may include UEs 130-1 and 130-2 (generically and individually referred to herein as "UE 130"), and provisioning system 100, connected with a network 205 via wired or wireless links. Network 205 may include one or more networks of any type, including an IMS network. Network 205 may include one or more wired networks, such as, for example, a local area network (LAN), a wide area network (WAN), a metropolitan area network (MAN), a cable network, a Public Switched Telephone Network (PSTN), an intranet, and/or the Internet. Network 205 may further include one or more wireless-based networks, such as, for example, a wireless satellite network and/or a wireless public land mobile network (PLMN). The wireless PLMN may include a Code Division Multiple Access (CDMA) 2000 PLMN, a Global System for Mobile Communications (GSM) PLMN, a Long Term Evolution (LTE) PLMN and/or other types of PLMNs. Network 205 may implement circuit-switched or packet-switched telephony. The packet-switched telephony may include IP based telephony. The IMS network may use SIP for voice and multimedia session control.

UEs 130-1 and 130-2 may each include, for example, a telephone (land-line or mobile), a personal digital assistant (PDA), or a computer (e.g., tablet, desktop, palmtop, or laptop). UEs 130-1 and 130-2 may each execute a respective phone client 135-1 and 135-2 that may send/receive voice and/or video calls to/from network 205 and may send/receive SIP signaling messaging to/from the IMS network of network 205. Phone clients 135-1 and 135-2 (generically and individually referred to herein as "phone client 135") may each maintain separate calling IDs, address books and voice mailboxes for each different MDN implicitly registered for a respective UE 130. For example, phone client 135-1 at UE 130-1 may maintain a calling ID, address book and voice mailbox for a personal MDN, and a different calling ID, address book and voice mailbox for a corporate MDN.

As further shown, network 205 may include a Proxy CSCF (P-CSCF) 210-$P_1$, a serving CSCF (S-CSCF) 210-$S_1$, an Interrogating CSCF (I-CSCF) 210-1, a S-CSCF 210-$S_2$, a P-CSCF 210-$P_2$, and HSS 125. P-CSCF 210-$P_1$, S-CSCF 210-$S_1$, I-CSCF 210-1, S-CSCF 210-$S_2$, and P-CSCF 210-$P_2$ may be generically and individually referred to herein as "CSCF 210".

P-CSCF 210-$P_1$ acts as an edge of the IMS network through which UE 130-1 obtains access. P-CSCF 210-$P_1$ maintains an awareness of all IMS endpoints that are currently registered with the IMS network, and performs various manipulations of SIP signaling messages that are arriving from, or being sent to, the IMS endpoints (e.g, UEs 130-1 and 130-2). P-CSCF 210-$P_1$ maintains a connection with S-CSCF 210-$S_1$.

S-CSCF 210-$S_1$ processes all originating and terminating SIP requests and responses associated with endpoints registered with S-CSCF 210-$S_1$ (including UE 130-1). S-CSCF 210-$S_1$ routes the SIP signaling towards its destination (e.g., towards P-CSCF 210-$P_1$ and UE 130-1), or towards UE 130-1 via I-CSCF 210-1. I-CSCF 210-1 passes SIP signaling to/from S-CSCF 210-$S_1$ and S-CSCF 210-$S_2$. I-CSCF 210-1 queries HSS 125 to learn the identity of the S-CSCF assigned to a given UE 130 so that it can properly forward the SIP signaling.

S-CSCF 210-S₂ processes all originating and terminating SIP requests and responses associated with endpoints registered with S-CSCF 210-S₂ (including UE 130-2). S-CSCF 210-S₂ routes the SIP signaling towards its destination (e.g., towards P-CSCF 210-P₂ and UE 130-2), or towards UE 130-1 via I-CSCF 210-1. P-CSCF 210-P₂ acts as an edge of the IMS network through which UE 130-2 obtains access. P-CSCF 210-P₂ maintains an awareness of all IMS endpoints that are currently registered with the IMS network, and performs various manipulations of SIP signaling messages that are arriving from, or being sent to, the IMS endpoints (e.g., UEs 130-1 and 130-2). P-CSCF 210-P₂ maintains a connection with S-CSCF 210-S₂.

P-CSCF 210-P₁, S-CSCF 210-S₁, I-CSCF 210-1, S-CSCF 210-S₂, or P-CSCF 210-P₂ may each include functionality implemented in multiple, different network devices, or in a same, single network device. HSS 125 may store IRS(s) 120. As described with respect to FIGS. 1A and 1B, IRS(s) 120 may link multiple MDNs associated with a single subscriber.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, network environment 200 may also include a Telephony Application Server (TAS) in network 205. Network 205 may further include numerous UEs (e.g., UEs 130-1 through 130-x, where x>2).

Figure 3:
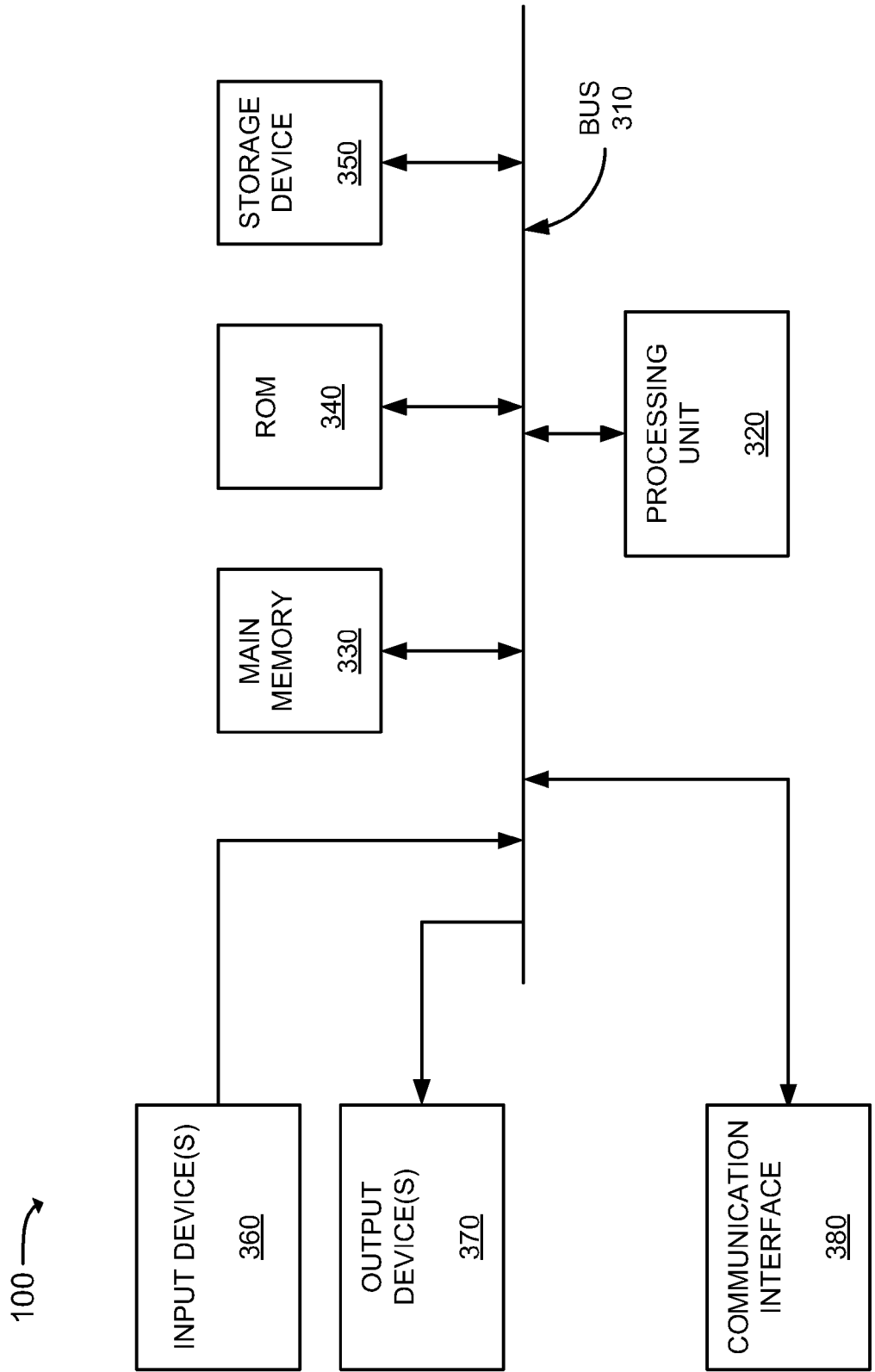
FIG. 3 is a diagram that depicts exemplary components of the provisioning system of FIGS. 1A, 1B and 2.

FIG. 3 is a diagram that depicts exemplary components of provisioning system 100. UE 130, HSS 125, and CSCF 210 may be similarly configured. Provisioning system 100 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of provisioning system 100.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

Input device 360 may include one or more mechanisms that permit an operator to input information to provisioning system 100, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables provisioning system 100 to communicate with other devices and/or systems. For example, communication interface(s) 380 may include wired or wireless transceivers for communicating via network 205.

The configuration of components of provisioning system 100 illustrated in FIG. 3 is for illustrative purposes. Other configurations may be implemented. Therefore, provisioning system 100 may include additional, fewer and/or different components than those depicted in FIG. 3.

Figure 4:
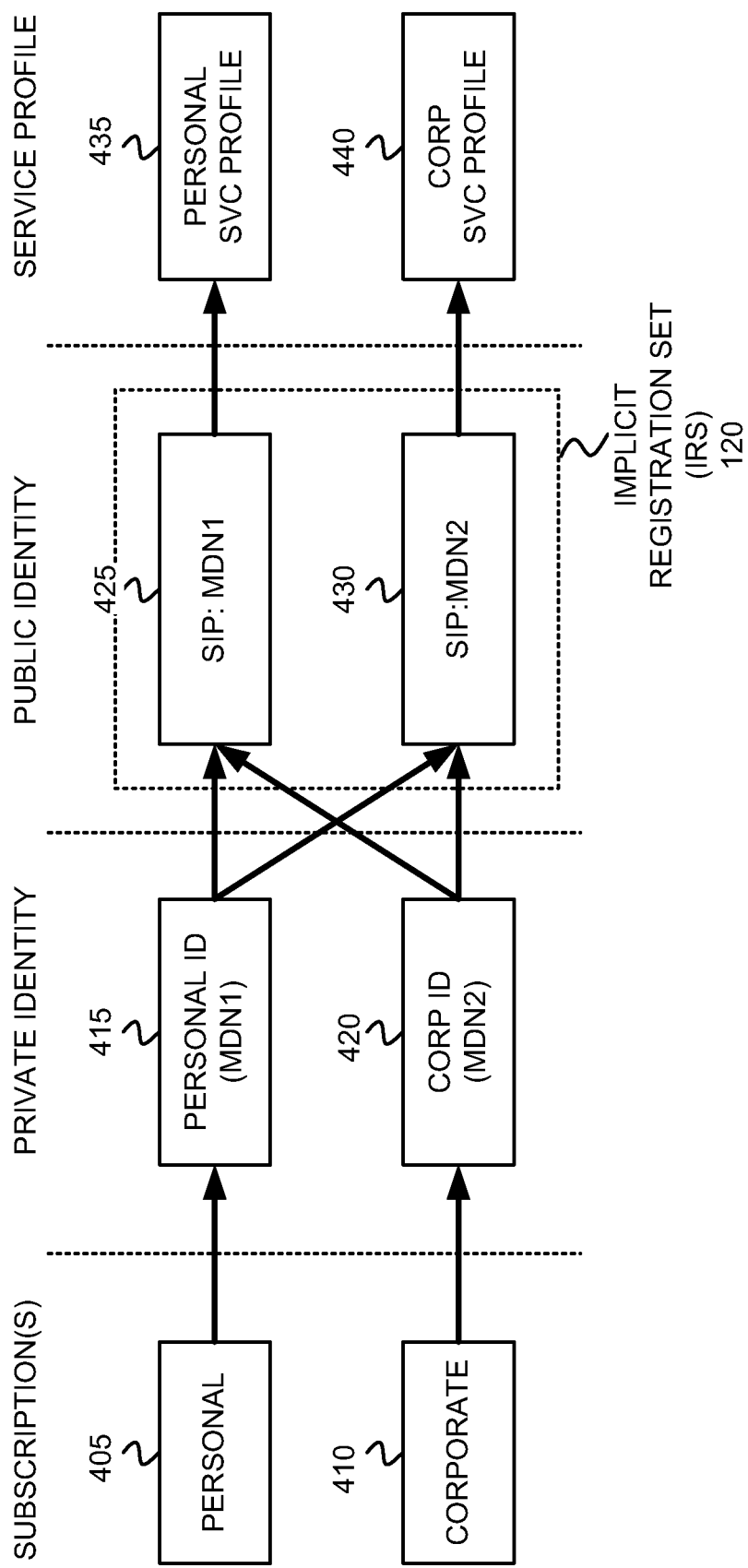
FIG. 4 graphically depicts the linkage of multiple Mobile Directory Numbers within the Implicit Registration Set of FIGS. 1A, 1B and 2.

FIG. 4 graphically depicts the linkage of multiple MDNs within an IRS 120. As shown in FIG. 4, an individual subscriber may have two different subscriptions: a personal subscription 405 and a corporate subscription 410. Personal subscription 405 is associated with a private identity that may include, for example, a personal ID 415 such as an MDN1. Corporate subscription 410 is associated with another private identity that may include, for example, a corporate ID such as an MDN2 420. A public identity may be associated with each of the individual subscriber's personal subscription 405 and corporate subscription 410 in IRS 120. As shown, the subscriber's personal subscription 405 may be associated with the public identity MDN1 425, and the subscriber's corporate subscription 410 may be associated with the public identity MDN2 430. As further shown in FIG. 4, IRS 120 links the individual subscriber's private ID with their public ID, their private ID with their public corporate ID, their private corporate ID with their public corporate ID, and their private corporate ID with their public personal ID. As further shown, public identity MDN1 425 is linked to personal service profile 435, and public identity MDN 2 430 is linked to corporate service profile 440. Though FIG. 4 depicts two different subscriptions being linked to two private identities, in other implementations, a single subscription may be linked to the two private identities.

Figure 5:
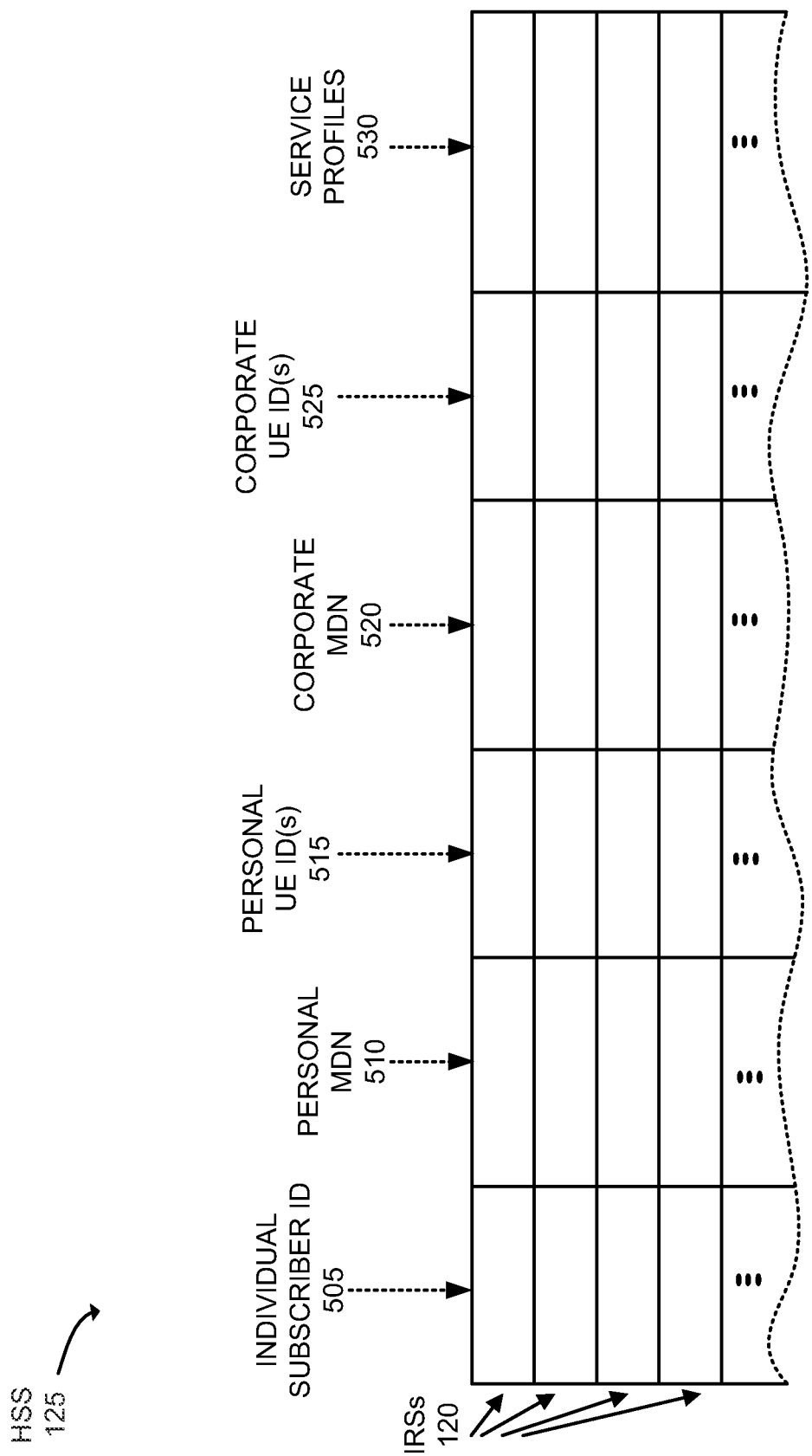
FIG. 5 illustrates exemplary details of the Home Subscriber Server of FIGS. 1A, 1B and 2.

FIG. 5 illustrates exemplary details of HSS 125. As shown, HSS 125 may store multiple different IRSs 120. Each IRS 120 may include an individual subscriber ID field 505, a personal MDN field 510, a personal UE ID(s) field 515, a corporate MDN field 520, a corporate UE ID(s) field 525, and a service profile field 530.

Individual subscriber ID field 505 stores a unique identifier associated with a given individual subscriber. In one embodiment, field 505 may store a mobile subscriber ID from a SIM card in the subscriber's UE 130 (e.g., an IMSI). Personal MDN field 510 stores a MDN associated with a personal account of the individual subscriber identified in field 505. Personal UE ID(s) field 515 stores a unique identifier associated with each of one or more UEs associated with the subscriber's personal account. Unique IDs associated with multiple UEs may be stored in field 515 to permit the implementation of a "bridged line appearance" where a call to the personal MDN identified in field 510 simultaneously "rings" at the multiple UEs identified in field 515. "Bridged line appearance" occurs when one identity is shared across two UEs.

Corporate MDN field 520 stores a MDN associated with a corporate account of the individual subscriber identified in field 505. Corporate UE ID(s) field 525 stores a unique identifier associated with each of one or more UEs associated with the subscriber's corporate account. Unique IDs associated with multiple UEs may be stored in field 525 to permit the implementation of a "bridged line appearance" where a call to the corporate MDN identified in field 520 simultaneously "rings" at the multiple UEs identified in field 525. Service profiles field 530 stores a personal service profile that specifies service parameters associated with the personal MDN identified in field 510, and a corporate service profile that specifies service parameters associated with the corporate MDN identified in field 520.

The number and content of the fields of each IRS 120 of HSS 125 in FIG. 5 is for illustrative purposes. Each IRS 120 of HSS 125 may include additional, fewer and/or different fields than those depicted in FIG. 5. For example, each IRS 120 may include three or more linked MDNs, and their associated UE IDs. In one example, IRS 120 may include personal MDN field 510, personal UE ID(s) field 515, corporate MDN field 520, corporate UE ID(s) field 525, and an additional corporate MDN field (e.g., corporate MDN2) and corporate UE ID(s) field (e.g., corporate UE ID(s) 2). HSS 125 is depicted in FIG. 5 as a tabulated data structure for purposes of illustration. Other types of data structures, not shown, may also be used for associating data fields 505-530 within an IRS 120.

Figure 6:
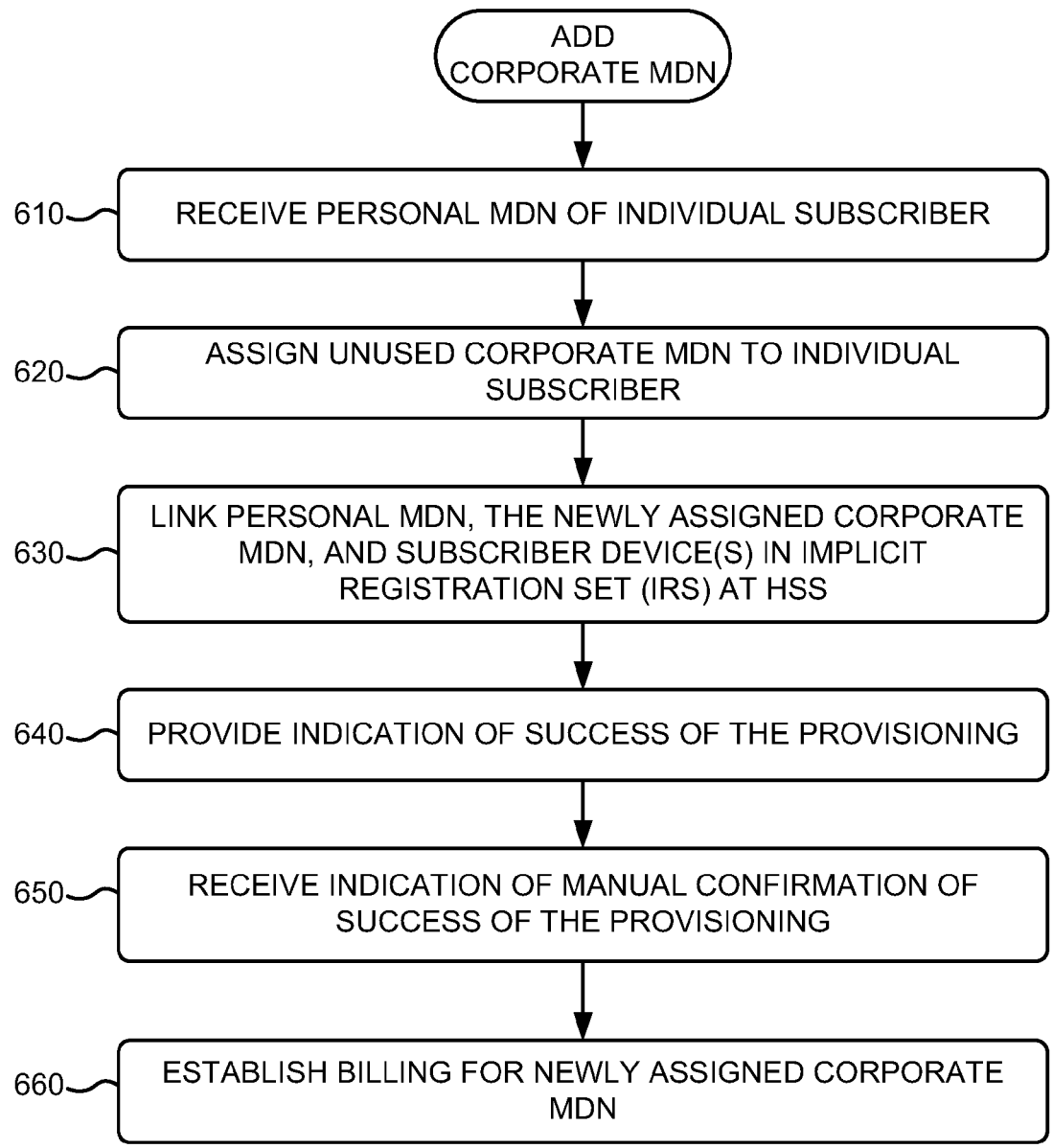
FIG. 6 is a flow diagram of an exemplary process for adding a new corporate Mobile Directory Number to be associated with an individual subscriber that already has an existing personal Mobile Directory Number associated with one or more user equipments.

FIG. 6 is a flow diagram of an exemplary process for adding a new corporate MDN to be associated with an individual subscriber that already has an existing personal MDN associated with one or more UEs. The exemplary process of FIG. 6 may be implemented by provisioning system 100. The exemplary process of FIG. 6 is described below with reference to the diagrams of FIGS. 7 and 8. The exemplary process of FIG. 6 may be selectively repeated for each MDN to be associated with the individual subscriber.

Figure 7:
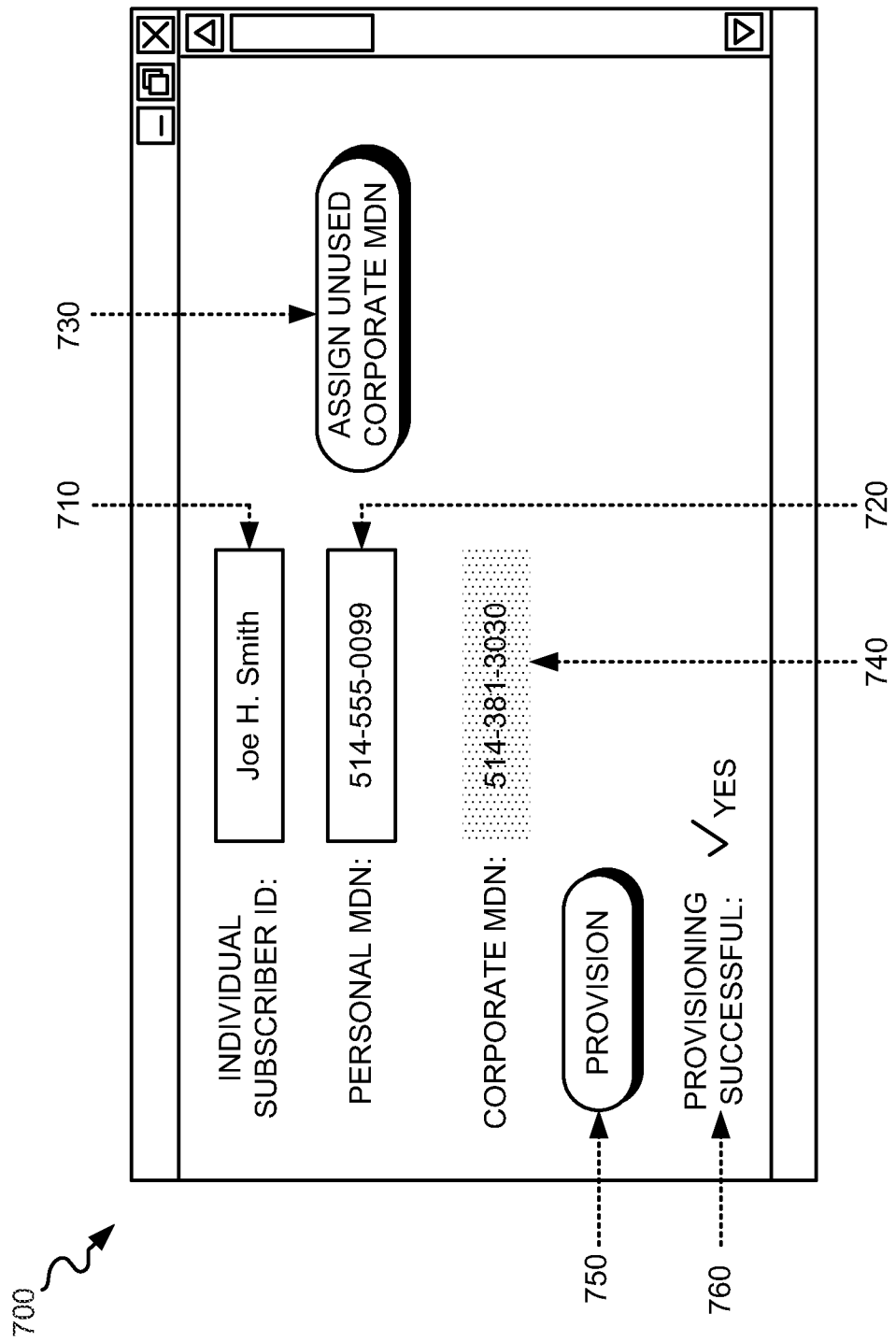
FIG. 7 is a diagram that depicts an exemplary user interface associated with the exemplary process of FIG. 6.
Figure 8:
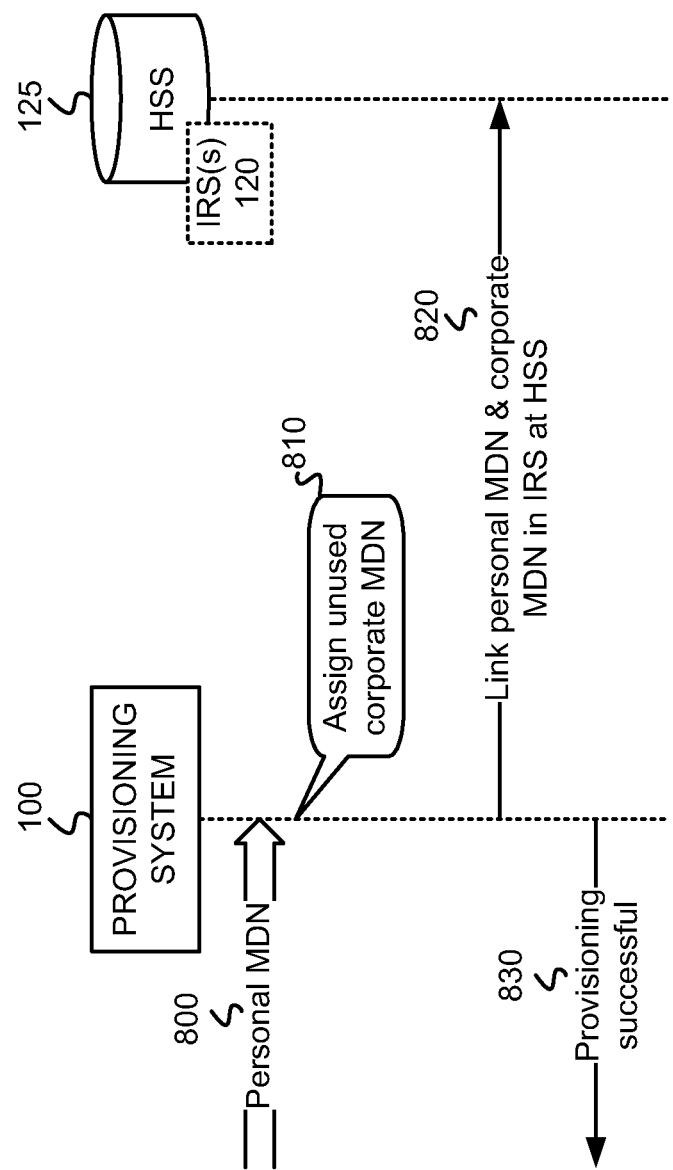
FIG. 8 is a diagram that depicts exemplary messaging associated with the exemplary process of FIG. 6.

The exemplary process may include provisioning system 100 receiving a personal MDN of the individual subscriber that is associated with one or more UEs (block 610). As shown in FIG. 7, a client device may execute a user interface 700 that permits entry of an individual subscriber ID 710 and a personal MDN 720. The client device (not shown) may be operated by a network administrator, an Information Technology (IT) representative, or other individual, that manually enters individual subscriber ID 710 and personal MDN 720. The messaging diagram of FIG. 8 depicts provisioning system 100 receiving a personal MDN 800.

Provisioning system 100 may assign an unused corporate MDN to the individual subscriber (block 620). Alternatively, the corporate MDN may be assigned by another device or supplied to provisioning system 100 by the network administrator, Information Technology (IT) representative, or other individual. For example, as shown in FIG. 7, a button 730 on user interface may be selected, and a corporate MDN 740 may be assigned from a block, or range, of available corporate MDNs. The messaging diagram of FIG. 8 depicts provisioning system 100 assigning 810 an unused corporate MDN.

Provisioning system 100 may link the received personal MDN and the newly assigned corporate MDN in IRS 120 at HSS 125 (block 630). Provisioning system 100 may additionally link the personal MDN and the newly assigned corporate MDN with one or more subscriber devices associated with the individual subscriber in IRS 120 at HSS 125. Referring to FIG. 5, provisioning system 100 may store the individual subscriber's ID in field 505, the personal MDN in personal MDN field 510, IDs, associated with one or more UEs to be associated with the personal MDN stored in field 510, in personal UE ID(s) field 515, the corporate MDN in corporate MDN field 520, IDs, associated with one or more UEs to be associated with the corporate MDN stored in field 520, in corporate UE ID(s) field 525, and the personal service profile and the corporate service profile for the individual subscriber in service profiles field 530. As shown in user interface 700 of FIG. 7, a provisioning button 750 may be selected to initiate the linking of the personal MDN and the assigned corporate MDN by provisioning system 100. The messaging diagram of FIG. 8 depicts provisioning system 100 linking 820 the personal MDN and the corporate MDN in IRS 120 at HSS 125.

Provisioning system 100 may provide an indication of successful provisioning (block 640). Upon successful completion of the linking of the personal MDN, the corporate MDN and the one or more subscriber devices, provisioning system 100 may send, as shown in FIG. 8, a message 830 indicating that the provisioning was successful. The message 830 may be sent to the client device implementing user interface 700 and/or to phone client 135-1 at UE 130-1. FIG. 7 depicts a provisioning successful indicator 760 displayed in user interface 700.

Provisioning system 100 may receive an indication of manual confirmation of the successful provisioning (block 650). The network administrator, Information Technology (IT) representative, or other individual may manually confirm the success of the provisioning by making an audio or video call to the assigned corporate MDN from another corporate MDN, and by making an audio or video call to the personal MDN from a non-corporate MDN. The network administrator, Information Technology (IT) representative, or other individual may further request the individual subscriber to make a call from UE 130-1 via the personal MDN and another call from UE 130-1 via the corporate MDN.

Provisioning system 100 may establish billing for the newly assigned corporate MDN (block 660). A billing system (not shown) may associate the newly assigned corporate MDN with the individual subscriber for purposes of maintaining billing records. Activity using the personal MDN may be billed to the individual subscriber, whereas activity using the corporate MDN may be billed to the corporate or business entity responsible for assigning the corporate MDN to the individual subscriber.

Figure 9:
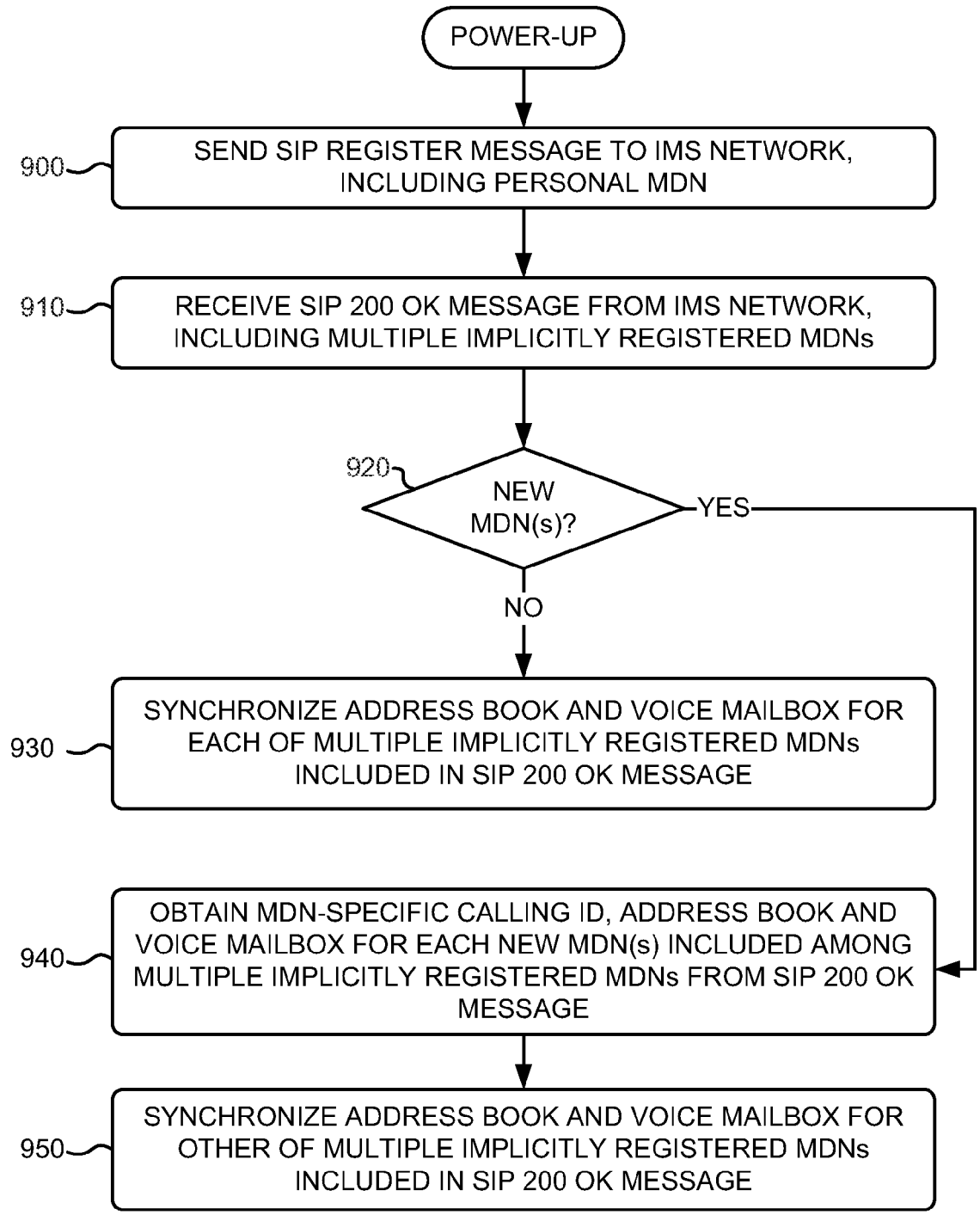
FIG. 9 is a flow diagram of an exemplary process for synchronizing multiple implicitly registered MDNs at a phone client upon power-up of a user equipment.

FIG. 9 is a flow diagram of an exemplary process for synchronizing multiple implicitly registered MDNs at phone client 135 upon power-up of UE 130. The exemplary process of FIG. 9 may be implemented by phone client 135. The exemplary process of FIG. 9 is described below with reference to the diagrams of FIGS. 10, 11A and 11B. The exemplary process of FIG. 9 may be selectively repeated each time that UE 130 powers up from a powered down status.

Figure 10:
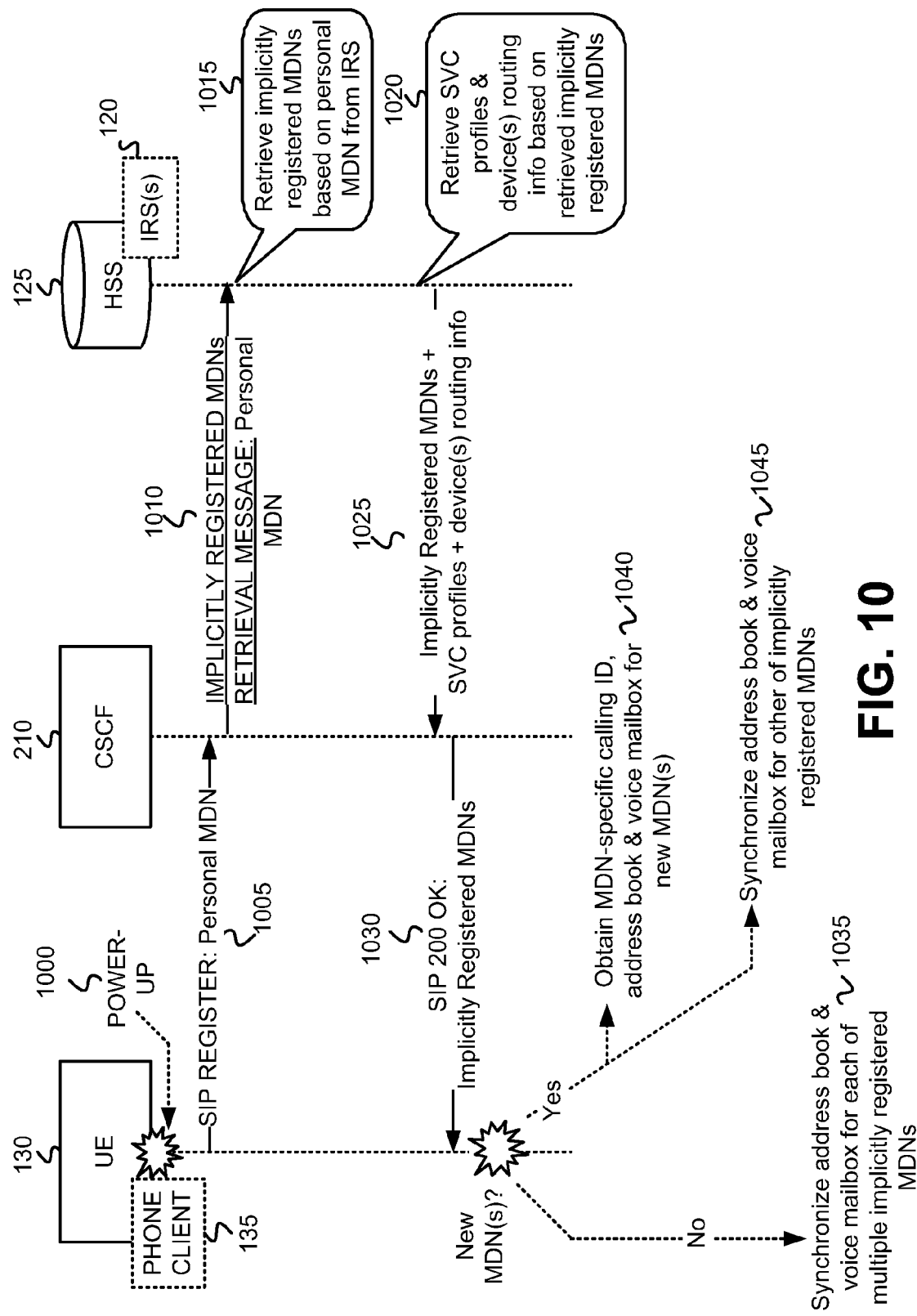
FIG. 10 is a diagram that depicts exemplary messaging associated with the exemplary process of FIG. 9.

The exemplary process may include phone client 135 sending a SIP REGISTER message to the IMS network that includes a personal MDN (block 900). As shown in FIG. 10, at power up 1000 of UE 130, phone client 135 sends SIP REGISTER message 1005 to CSCF 210, where message 1005 includes the personal MDN. As further shown in FIG. 10, upon receipt of SIP REGISTER message 1005, CSCF 210 may send a message 1010 to retrieve the multiple implicitly registered MDNs from IRS 120 based on the personal MDN received in message 1005. As also shown in FIG. 10, HSS 125 may retrieve 1015 the multiple implicitly registered MDNs from IRS 120 based on the received personal MDN. HSS 125 may further retrieve 1020 service profiles and device(s) routing information based on the retrieved implicitly registered MDNs. The service profiles may include the personal service profile and the corporate service profile in the case where the multiple implicitly registered MDNs includes a personal subscription and a corporate subscription. The device(s) routing information may include the information necessary for routing a call to one or more devices associated with a particular MDN. HSS 125 may, via message 1025, return the retrieved implicitly registered MDNs, service profiles, and device(s) routing information to CSCF 210 which, in turn, may store all of this information locally handling future calls to the implicitly registered MDNs. In one example, the multiple implicitly registered MDNs retrieved from IRS 120 may include the personal MDN and the corporate MDN associated with the individual subscriber. In other embodiments, messaging protocols other than SIP may be used to obtain the multiple implicitly registered MDNs at client 135. In such embodiments, messaging other than the SIP REGISTER message of block 900, and the SIP 200 OK message of block 910, may be used to obtain the multiple implicitly registered MDNs at client 135 from IRS 120.

Figures 11A, 11B:
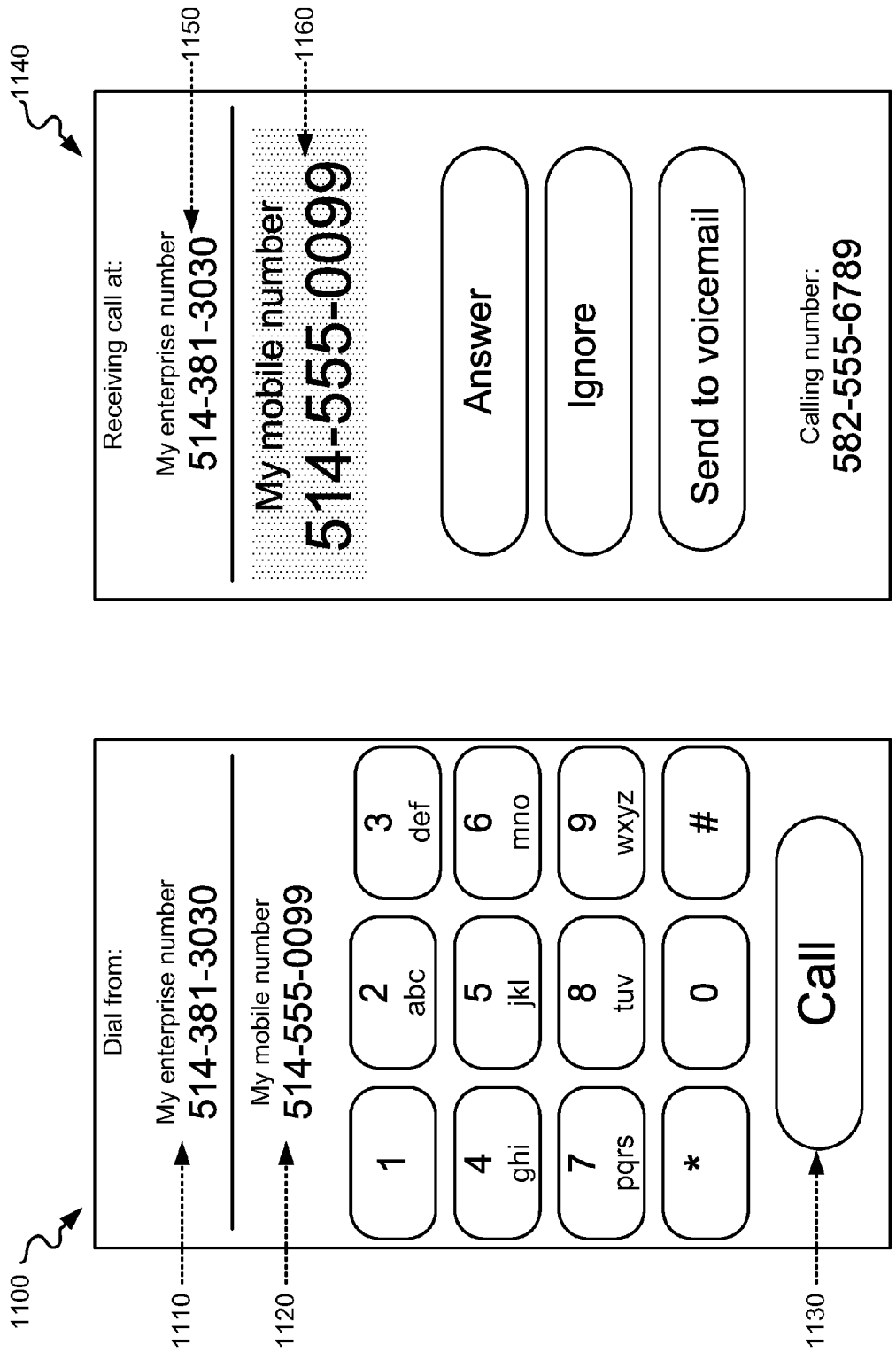
FIGS. 11A and 11B are diagrams that illustrate the implementation of a personal Mobile Directory Number and a corporate Mobile Directory Number at a user equipment.

Phone client 135 may receive a SIP 200 OK message from the IMS network, including multiple implicitly registered MDNs (block 910). FIG. 10 depicts CSCF 210 sending a SIP 200 OK message 1030 to UE 130, where message 1025 includes the implicitly registered MDNs retrieved from IRS 120 of HSS 125. Phone client 135 may determine if the SIP 200 OK message includes any new MDN(s) (block 920). The new MDN(s) may include any implicitly registered MDNs not previously received from CSCF 210. If the SIP 200 OK message does not include any new MDN(s) (NO—block 920), then phone client 135 may synchronize the address book and voice mailbox for each of the multiple implicitly registered MDNs included in the SIP 200 OK message (block 930). Synchronizing the address book and voice mailbox may include determining if there are any new voice mails for each of the multiple implicitly registered MDNs, and if there have been any changes to the address book for each of the multiple implicitly registered MDNs. FIG. 10 depicts phone client 135 of UE 130 synchronizing 1035 the address book and voice mailbox for each of the multiple implicitly registered MDNs from SIP 200 OK message 1025. If the SIP 200 OK message includes at least one new MDN (YES—block 920), then phone client 135 may obtain the MDN-specific calling ID, address book, and voice mailbox for each new MDN(s) included among the multiple implicitly registered MDNs from the SIP 200 OK message (block 940). In the example where the multiple implicitly registered MDNs include the personal MDN and the corporate MDN, then phone client 135 at UE 130 may obtain a first calling ID, a first address book and a first voice mailbox for the personal MDN, and may obtain a second calling ID, a second address book and a second voice mailbox for the corporate MDN. FIG. 10 shows phone client 135 of UE 130 obtaining 1040 the MDN-specific calling ID, address book, and voice mailbox for the new MDN(s). The MDN-specific calling ID, address book and/or voice mailbox may be obtained from CSCF 210, HSS 125, or from another network source. Phone client 135 may then synchronize the address book and voice mailbox for other of the multiple implicitly registered MDNs included in the SIP 200 OK message (block 950). Synchronizing the address book and voice mailbox may include determining if there are any new voice mails for each of the other of the multiple implicitly registered MDNs, and if there have been any changes to the address book for each of the other of the multiple implicitly registered MDNs. FIG. 10 depicts phone client 135 of UE 130 synchronizing 1045 the address book and the voice mailbox for the other of the implicitly registered MDNs (i.e., the MDNs other than the new MDN(s)). FIG. 11A depicts a display 1100 of UE 130 subsequent to the exemplary process of FIG. 9 when the individual subscriber wishes to initiate a call via one of the MDNs at UE 130. As shown, the individual subscriber may select either a corporate MDN 1110 or a personal MDN 1120 from which to place a call 1130 from UE 130. FIG. 11B depicts a display 1140 of UE 130 subsequent to auto-provisioning based on the received multiple implicitly registered MDNs, when a call is received at UE 130 via one of the multiple MDNs. As shown, a corporate MDN 1150 and a personal MDN 1160 are displayed, with personal MDN 1160 being highlighted to indicate that an incoming call is being received at UE 130 for the personal MDN. The individual subscriber may select the personal MDN 1160, as the incoming call, and then select whether to "answer," "ignore," or "send to voicemail" the incoming call of the selected MDN.

Figure 12:
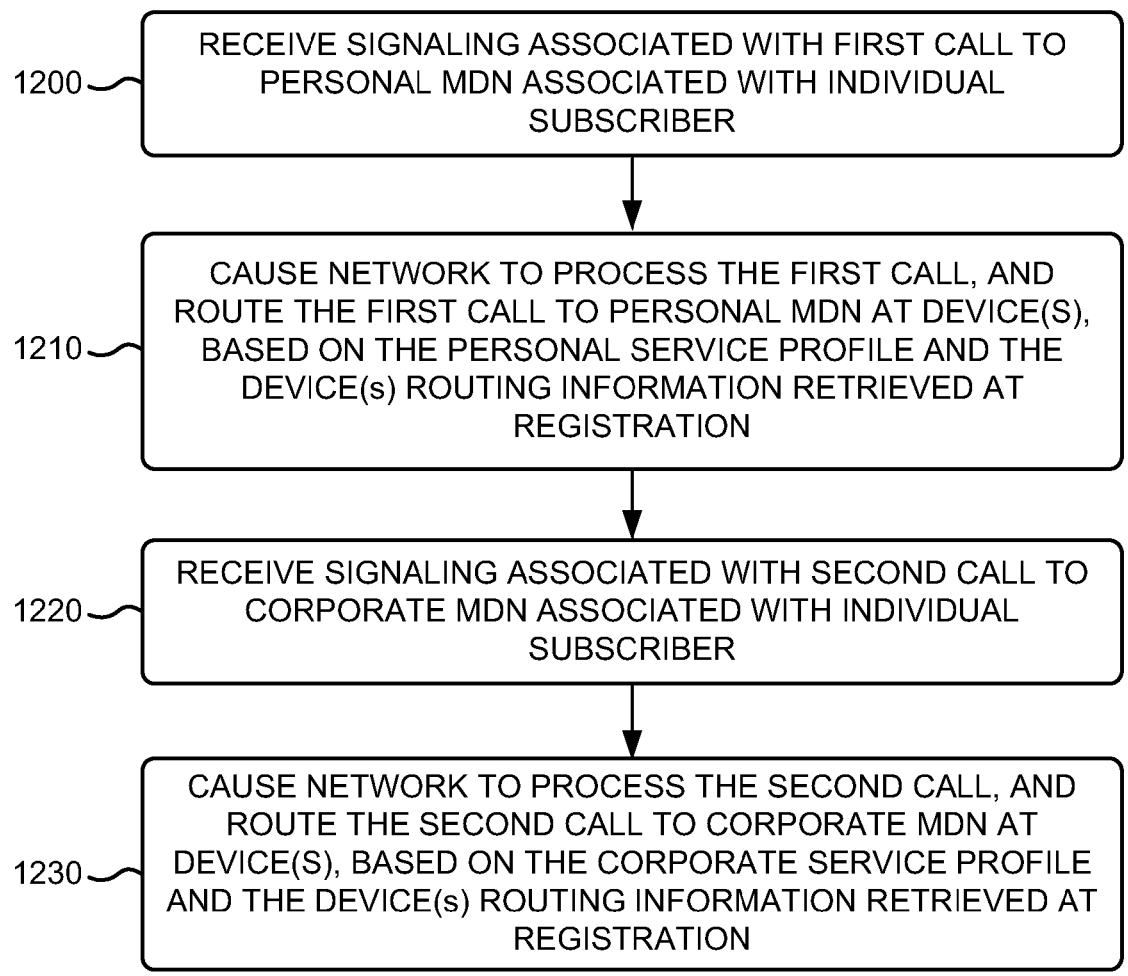
FIG. 12 is a flow diagram of an exemplary process for handling calls to a subscriber at a UE that is implicitly registered with multiple MDNs.

FIG. 12 is a flow diagram of an exemplary process for handling calls to a subscriber at a UE that is implicitly registered with multiple MDNs. The exemplary process of FIG. 12 may be implemented by CSCF 210 in an IMS network. The exemplary process of FIG. 12 is described below with reference to the messaging diagram of FIG. 13.

Figure 13:
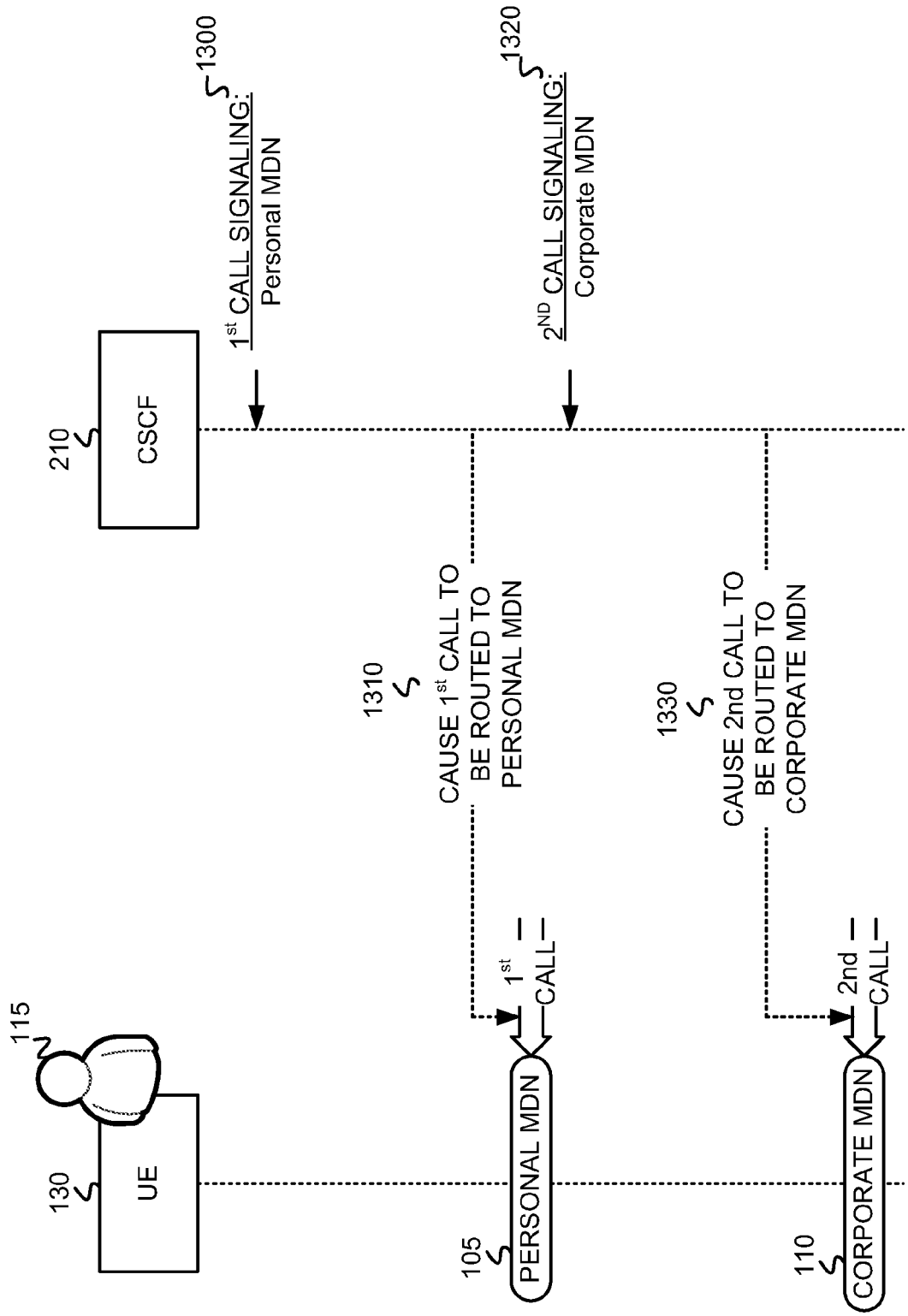
FIG. 13 is a diagram that depicts exemplary messaging associated with the exemplary process of FIG. 12.

The exemplary process may include CSCF 210 receiving signaling associated with a first call to a personal MDN associated with an individual subscriber (block 1200). FIG. 13 depicts signaling 1300 associated with a first call to the personal MDN associated with individual subscriber 115. CSCF 210 may cause network 205 to process the first call, and route the first call to the personal MDN at device(s), based on personal service profile and the device(s) routing information retrieved at registration (block 1210). CSCF 210 may have previously received the personal service profile and the device(s) routing information from HSS 125 as shown at 1020 and 1025 in FIG. 10. Causing network 205 to route the first call may involve using existing signaling to route the first call via elements of the transport network to UE 130. FIG. 13 depicts CSCF 210 causing 1310 the first call to be routed to personal MDN 105 at UE 130 of individual subscriber 115.

CSCF 210 may receive signaling associated with a second call to a corporate MDN associated with the individual subscriber (block 1220). FIG. 13 depicts signaling 1320 associated with a second call to the corporate MDN associated with individual subscriber 115.

CSCF 210 may cause network 205 to process the second call, and route the second call to the corporate MDN at device(s), based on the corporate service profile and the device(s) routing information retrieved at registration (block 1230). CSCF 210 may have previously received the corporate service profile and the device(s) routing information from HSS 125 as shown at 1020 and 1025 in FIG. 10. Causing network 205 to route the second call may involve using existing signaling to route the second call via elements of the transport network to UE 130. FIG. 13 depicts CSCF 210 causing 1330 the second call to be routed to corporate MDN 110 at UE 130 of individual subscriber 115.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 9, and 12, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a device, a personal Mobile Directory Number (MDN) associated with an individual subscriber, wherein the individual subscriber is further associated with one or more subscriber devices;
receiving, at the device, a corporate MDN assigned to the individual subscriber;
linking, by the device, the corporate MDN, the personal MDN, and the one or more subscriber devices within an Implicit Registration Set (IRS) at a Home Subscriber Server (HSS) in an Internet Protocol Multimedia Subsystem (IMS) for routing calls to the individual subscriber's corporate MDN or personal MDN at the one or more subscriber devices;
retrieving data from the IRS at the HSS;
receiving signaling associated with a first call to the personal MDN;
causing the first call to be routed to the one or more subscriber devices linked to the personal MDN based on the retrieved data;
receiving signaling associated with a second call to the corporate MDN; and
causing the second call to be routed to the one or more subscriber devices linked to the corporate MDN based on the retrieved data.

2. The method of claim 1, wherein the one or more subscriber devices comprise at least two subscriber devices and wherein the corporate MDN is associated with the at least two subscriber devices.

3. The method of claim 1, further comprising:
receiving the personal MDN and the corporate MDN from another device.

4. The method of claim 1, further comprising:
receiving an indication that manual confirmation of the linking of the corporate MDN, the personal MDN and the one or more subscriber devices has been successful.

5. A system, comprising:
a provisioning device configured to:
receive, via the communication interface, a personal Mobile Directory Number (MDN) associated with an individual subscriber, wherein the individual subscriber is further associated with one or more devices,
receive, via the communication interface, a corporate MDN assigned to the individual subscriber,
link, via the communication interface, the corporate MDN, the personal MDN, and the one or more user devices, within an Implicit Registration Set (IRS) at a Home Subscriber Server (HSS) in an Internet Protocol Multimedia Subsystem (IMS) network for routing calls to the individual subscriber's corporate MDN or personal MDN at the one or more devices; and
a network device, comprising a Call Session Control Function (CSCF) in an Internet Protocol Multimedia Subsystem (IMS) network, configured to:
retrieve data from the IRS at the HSS,
receive signaling associated with a first call to the personal MDN,
cause the first call to be routed to the one or more subscriber devices linked to the personal MDN based on the retrieved data,
receive signaling associated with a second call to the corporate MDN, and
cause the second call to be routed to the one or more subscriber devices linked to the corporate MDN based on the retrieved data.

6. The system of claim 5, wherein the personal MDN comprises a MDN associated with a personal account of the individual subscriber and wherein the corporate MDN comprises a MDN associated with a corporate account of the individual subscriber.

7. The system of claim 5, wherein the one or more devices comprise at least two devices and wherein the corporate MDN is associated with the at least two devices.

8. The system of claim 5, wherein the provisioning device is further configured to:
receive the personal MDN and the corporate MDN via a user interface implemented at another device.

9. A method, comprising:
powering up a device;
sending, upon power-up of the device, a Session Initiation Protocol (SIP) message from a phone client of the device to a remote network device;
receiving, at the phone client of the device from the remote network device, a SIP reply message that includes an identification of multiple Mobile Directory Numbers (MDNs) linked to an individual subscriber associated with the device; and
obtaining, at the device, a MDN-specific calling ID, an address book, and a voice mailbox for each of the multiple MDNs identified in the SIP reply message.

10. The method of claim 9, wherein the device comprises a land-line or mobile telephone, a personal digital assistant (PDA), or a tablet, desktop, palmtop, or laptop computer.

11. The method of claim 9, wherein the remote network device comprises a Call Session Control Function (CSCF) in an Internet Protocol Multimedia Subsystem (IMS) network.

12. The method of claim 9, further comprising:
receiving, at the device, an indication of a first outgoing call via a first one of the multiple MDNs, from the individual subscriber;
initiating the first outgoing call from the device;
receiving, at the device, an indication of an outgoing call via a second one of the multiple MDNs, from the individual subscriber; and
initiating the second outgoing call from the device.

13. The method of claim 9, wherein the multiple MDNs comprise a first MDN and a second MDN and wherein the obtaining comprises:
obtaining a first MDN-specific calling ID, a first address book, and a first voice mailbox for the first MDN, and
obtaining a second MDN-specific calling ID, a second address book, and a second voice mailbox for the second MDN.

14. The method of claim 9, wherein the multiple MDNs comprise a first MDN and a second MDN, wherein the first MDN comprises a MDN associated with a personal account of the individual subscriber, and wherein the second MDN comprises a MDN associated with a corporate account of the individual subscriber.

15. A device, comprising:
a communication interface; and
a processing unit configured to execute a phone client to:
send, upon power-up of the device, a Session Initiation Protocol (SIP) message from the phone client to a remote network device via the communication interface, receive, at the phone client from the remote network device via the communication interface, a SIP reply message that includes an identification of multiple Mobile Directory Numbers (MDNs) linked to an individual subscriber associated with the device, and obtain a MDN-specific calling ID, an address book, and a voice mailbox for each of the multiple MDNs identified in the SIP reply message.

16. The device of claim 15, wherein the device comprises a land-line or mobile telephone, a personal digital assistant (PDA), or a tablet, desktop, palmtop, or laptop computer.

17. The device of claim 15, wherein the remote network device comprises a Call Session Control Function (CSCF) in an Internet Protocol Multimedia Subsystem (IMS) network.

18. The device of claim 15, wherein the communication interface is further configured to receive an indication of a first outgoing call, via a first one of the multiple MDNs, from the individual subscriber, and wherein the processing unit is further configured to initiate the first outgoing call from the device.

19. The device of claim 18, wherein the communication interface is further configured to receive an indication of an outgoing call, via a second one of the multiple MDNs, from the individual subscriber; and wherein the processing unit is further configured to initiate the second outgoing call from the device.

20. The device of claim 15, wherein the multiple MDNs comprise a first MDN and a second MDN and wherein, when obtaining, the processing unit is further configured to execute the phone client to:

obtain a first MDN-specific calling ID, a first address book, and a first voice mailbox for the first MDN, and obtain a second MDN-specific calling ID, a second address book, and a second voice mailbox for the second MDN.

21. The device of claim 15, wherein the multiple MDNs comprise a first MDN and a second MDN, wherein the first MDN comprises a MDN associated with a personal account of the individual subscriber, and wherein the second MDN comprises a MDN associated with a corporate account of the individual subscriber.

* * * * *